United States Patent Office 3,810,823
Patented May 14, 1974

3,810,823
METHOD FOR ISOLATION OF ENZYMES
Katsumi Fujii, Suita, Isamu Takagahara, Takatsuki, Yasuo Suzuki, Suita, and Takekazu Horio, Takatsuki, Japan, assignors to Oriental Yeast Co., Ltd., Tokyo, Japan
No Drawing. Filed Dec. 20, 1971, Ser. No. 210,048
Claims priority, application Japan, Dec. 18, 1970, 45/113,028
Int. Cl. C07g 7/02
U.S. Cl. 195—66 R                                    4 Claims

ABSTRACT OF THE DISCLOSURE

The present invention relates to a method for isolation of enzymes, particularly a method for isolation of inorganic phosphate-dependent enzymes. The invention is based on the fact that inorganic phosphate-dependent enzymes are adsorbed on a water-insoluble carrier containing phosphoric acid group according to enzymatic affinity and they are eluted from the carrier if a substrate competitive with the inorganic phosphate is added. The method for isolation of inorganic phosphate-dependent enzymes of the present invention utilizes quantitative difference in enzymatic properties among various enzymes (i.e. specificities of enzymes). According to the method of the present invention, enzymes which have been difficultly purified according to conventional purification methods can be obtained in extremely high yields.

---

The present invention relates to a method for isolation of enzymes, particularly to a method for isolation of inorganic phosphate-dependent enzymes (hereinafter referred to as Pi-dependent enzymes).

The "Pi-dependent enzymes" in this specification include generally enzymes which utilize inorganic phosphate (hereinafter referred to as Pi) as substrate or which yield Pi as the reaction products or enzymes by which the reactions catalyzed are inhibited or activated by Pi.

As enzymes which utilize Pi as substrate or which yield Pi as the reaction products, there may be mentioned, for example, glyceraldehyde 3-phosphate dehydrogenase and inorganic pyrophosphatase. As enzymes the reaction of which is inhibited by Pi, there may be mentioned, for example, glucose 6-phosphate dehydrogenase, 6-phosphogluconate dehydrogenase, ribulose 1,6 diphosphate dehydrogenase and pyruvate kinase. Enzymes the reaction of which is activated by Pi are, for example, fumarase and urease.

These Pi-dependent enzymes are important enzymes directly participating in the vital phenomena in cells and wide uses are expected as laboratory reagents in biochemical fiields and, in addition, clinical and pathological reagents in medical and pharmaceutical fields.

Some of these enzymes have been extracted from animal tissues and microorganisms and purified before use. However, commercial products of the enzymes are very expensive or the products could not be obtained, since practical method for purification has never been found. Therefore, the utilization of the enzymes has been limited though the enzymes are very useful. Under the circumstances as above, the production of the enzymes in high purity and at a low cost has been expected very much.

Conventional enzyme isolation methods are as follows:

(1) Isoelectric point precipitation method wherein properties of amphoteric electrodes that solubility thereof varies dependent upon hydrogen ion concentration and the solubility is the least around isoelectric point are utilized;

(2) Salting-out method wherein difference in solubility between the enzymes in a solution of a neutral salt such as ammonium sulfate or sodium sulfate is utilized;

(3) Organic solvent precipitation method wherein enzymes are precipitated fractionally by gradually lowering solubility by addition of an alcohol, acetone, dioxane, etc. to the enzyme solution;

(4) Heat treatment method wherein temperature of enzyme solution is elevated to denaturize and to solidify undesired protein taking advantage of difference in heat stability of enzymes followed by removal of the protein;

(5) Selective precipitation method wherein a special precipitation reagent such as protamine sulfate or lead acetate is used;

(6) Selective adsorption method wherein a special adsorbent such as aluminum hydroxide or calcium phosphate gel is used.

(7) Ion exchanging chromatography and electrophoresis wherein difference in electric charge among proteins is utilized principally;

(8) Crystallization method.

In the above mentioned, publicly known purification methods, quantitative difference in physicochemical properties among enzymes or proteins but not qualitative difference in biological properties of the enzymes has been utilized. Consequently, isolation of each enzyme in a sufficient purity has been vary difficult, though enzymes and proteins of near physicochemical properties have been obtained successfully as a group. For purifying respective enzymes, very troublesome and expensive procedures such as combination of various purification methods or repetition of the methods have been required.

For example, the following method has been reported for the purification of glucose 6-phosphate dehydrogenase which is a member of Pi-dependent enzymes (Journal of Biological Chemistry, vol. 236, No. 5, pp. 1225–1230, 1961). A glucose 6-phosphate dehydrogenase sample of 3800 fold purity has been obtained in a poor recovery of only 13% (I.U./I.U. of enzymes: The same shall apply hereinafter) from an autolysis extract of dried brewer's yeast via 15 purification stages, i.e. fractional precipitation with silver nitrate, fractional salting-out with ammonium sulfate, precipitation with alcohol as an organic solvent, fractional adsorption with bentonite, fractional salting-out with ammonium sulfate, fractional precipitation with manganic ion, precipitation with acetone as an organic solvent, fractional salting-out with ammonium sulfate, ion-exchanging chromatography with DEAE-SF (a trade name of weak basic ion-exchanger), fractional salting-out with ammonium sulfate and crystallization (twice).

The following method has been reported for the purification of pyruvate kinase which is another member of Pi-dependent enzymes (Journal of Biological Chemistry, vol. 244, No. 18, pp. 4815–4818, 1969). A pyruvate kinase sample of about 50 fold purity (based on crude extract) has been obtained in a poor recovery of 44.9% from an autolysis extract of baker's yeast by a purification process comprising fractional salting-out with ammonium sulfate, ion-exchanging chromatography with DEAE-cellulose, ion-exchanging chromatography with P-cellulose and fractional salting out with ammonium sulfate.

An object of the present invention is to provide a method for isolation of enzymes to obtain enzymes of high purities in a simple manner, particularly to provide a method for obtaining Pi-dependent enzymes in high purities in a simple, inexpensive manner.

The inventors have found that Pi-dependent enzymes are generally adsorbed on water-insoluble carriers such as cellulose phosphate containing

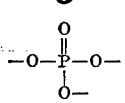

group according to their enzymatic affinity to Pi and that the enzymes adsorbed by the enzymatic affinity are eluted from the carriers if a substrate competing with Pi is added. The present invention has been accomplished on the basis of these findings.

The present invention utilizes qualitative difference in biological properties of enzymes (i.e. specificities of enzymes) but not quantitative difference in physicochemical properties thereof. Thus, the invention differs from conventional purification methods theoretically.

The present invention relates to a method for isolation of enzymes characterized by contacting a crude enzyme solution not containing a eluent given below with a carrier comprising water-insoluble organic or inorganic compound containing

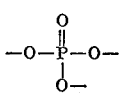

group to adsorb Pi-dependent enzymes and basic proteins not included in said enzymes on the carrier, thereafter contacting the carrier with an aqueous solution containing at least one eluent selected from the group consisting of substrates, coenzymes, inhibitors and activators which are competitive with Pi in the relation to respective enzymes, and specific to respective enzymes, thereby selectively eluting the adsorbed respective enzymes in the aqueous solution.

In the above method, Pi-dependent enzymes are adsorbed on the carrier due to enzymatic affinity thereof to Pi, while basic proteins not included in said enzymes are adsorbed on the carrier due to static electric force thereof. The basic proteins, however, are separated from the Pi-dependent enzymes finally, since the basic proteins are not eluted from the carrier in the successive elution step.

The present invention relates also to a method for isolation of enzymes characterized by contacting a crude enzyme solution not containing eluent from which basic proteins have been removed previously with said carrier to adsorb the inorganic phosphate-dependent enzymes on the carrier by enzymatic affinity and thereafter selectively eluting the adsorbed, respective enzymes in the same manner as above.

The crude enzyme solutions used in the method of the present invention are extracts from mechanical crush products or autolysates of microorganisms such as yeast or bacteria or extracts from homogenates of various animal tissues and plants. If the crude enzyme solutions contain any eluent, the eluent should be removed previously.

The crude enzymes solutions contain, in addition to Pi-dependent enzymes and other various enzymes, various acidic, neutral and basic proteins other than enzymes. It is not necessary to remove such proteins before the purification process.

The crude enzyme solution wtasnicdteoc7__—0__4__oe

The crude enzyme solution is contacted with a carrier comprising a water-insoluble organic or inorganic compound containing

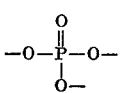

group to adsorb Pi-dependent enzymes and basic proteins not included in these enzymes on the carrier.

As carriers comprising water-insoluble organic compounds containing

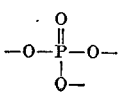

group, there may be used, for example, P-cellulose (cellulose phosphate), PPM-cellulose (phosphorylmethylcellulose) and Duolite ES-63 (a trade name of Diamond Alkali Company in U.S.A.). As carriers comprising water-insoluble inorganic compounds containing said group, there may be used, for example, calcium phosphate gel and magnesium phosphate.

The contact of the crude enzyme solution on the carrier is effected by passing the crude enzyme solution through a column packed with the carrier or by suspending the carrier in the crude enzyme solution.

Thus, by contacting the crude enzyme solution with the carrier, the Pi-dependent enzymes and basic proteins not included by said enzymes are adsorbed on the carrier.

In this connection, the adsorption of the Pi-dependent enzymes is due to enzymatic affinity with the carrier, whereas the adsorption of the basic enzymes not included by said enzymes is due to static electric force between electric charge of the basic proteins and that of the carrier.

Thereafter, the carrier is contacted with an aqueous solution containing at least one eluent selected from the group consisting of substrates, coenzymes, inhibitors and activators which are sepecific (selective) to each enzyme and competitive with (or antagonistic or opposing to) Pi to selectively elute respective Pi-dependent enzymes in the aqueous solution.

If an aqueous solution containing a substrate, coenzyme, inhibitor or activator not competitive with (or antagonistic to) Pi is used, the Pi-dependent enzymes are not eluted from the carrier at all.

For example, glucose 6-phosphate dehydrogenase can be isolated in pure form by contacting the enzyme adsorbed carrier with an eluent comprising aqueous solution of nicotinamide adenine dinucleotide phosphate (NADP) which is a coenzyme of said enzyme.

For example, 6-phosphogluconate dehydrogenase can be isolated in pure form by contacting the enzyme adsorbed carrier with an eluent comprising aqueous solution of 6-phosphogluconate which is a substrate of said enzyme.

In the same manner, puruvate kinase, inorganic pyrophosphatase and ribulose diphosphate carboxylase can be isolated selectively by contacting the enzyme adsorbed carrier with eluents comprising aqueous solutions of a substrate, i.e. adenosine triphosphate (ATP), a pyrophosphate and ribulose diphosphate, respectively.

If the purified enzyme solution is concentrated according to ultrafiltration or the like and added slowly with, for example, ammonium sulfate, crystalline enzyme can be obtained. If the eluent is to be removed, gel filtration and dialyzation may be performed.

In case basic proteins have been removed previously from the crude enzyme solution used in the present invention, only Pi-dependent enzymes are adsorbed on the carrier. Consequently, capacity of carrier for adsorption of Pi-dependent enzymes is increased remarkably. Therefore, according to this method, amounts of carrier and eluent may be small and the purification procedures become easy and simple. Another characteristic merit of the method is that enzyme solution of a high concentration is obtained, since only a small amount of eluent is used.

In the method for isolation of enzymes of the present invention described above in detail, advantage of specific affinity of enzymes with carriers and eluents is taken and, therefore, the method is theoretically different from conventional purification methods. Accordingly, enzymes which could not be purified easily due to their analogous physicochemical properties can be obtained in extremely high purities.

Further, many kinds of enzymes can be purified successively in one stage purification by changing eluents successively, since the purification is effected under quite mild conditions.

The present invention is quite advantageous from industrial viewpoint, since the purification procedure is simple and completed with a short period of time, trouble due to scale-up is hardly observed and the procedure can be carried out in a simple equipment.

The ion-exchanging chromatography is the most preferred method in the conventional methods for isolation of enzymes, since the procedure is relatively simple and fairly high isolation effect is obtained under mild conditions. However, contamination by substances of quantitatively similar properties is unavoidable even under selected purification conditions, since said method also depends upon quantitative difference in electric properties such as isoelectric point of the enzymes. On the other hand, the purification method of the present invention possesses the merits of conventional ion-exchanging chromatography and, in addition, "a clearcut elution" can be effected according to this method, since the method is based on, intrinsic, strict specificities of enzymes for substrates and in which elution is effected by a special eluent specific to a special enzyme. Thus, it is an ideal isolation method.

The method of the present invention will be illustrated by way of examples in which percentages are shown in volume unless otherwise stated.

EXAMPLE 1

[Isolation of glucose 6-phosphate dehydrogenase (hereinafter referred to as G-6-PDH)]

Two liters of ethyl acetate were added to 20 kg. of wet cell of yeast Candida utilis and the whole was stirred thoroughly to effect autolysis. Soluble components were extracted with 20 liters of 0.1 saturated ammonium sulfate solution at room temperature for 24 hours. Insoluble matter was remoxed by centrifugation to obtain crude extract containing $336 \times 10^4$ I.U. of G-6-PDH.

The solvent in the extract was replaced with 50 mM. triethanolamine-HCl buffer solution (pH 7.5) by passing it through a column of 20 liters of Sephadex G-25. The extract was passed through a column of 20 liters of DEAE-cellulose to adsorb G-6-PDH (simultaneously basic proteins were passed and thereby removed). Then, the product was washed with 40 liters of 50 mM. triethanolamine-HCl buffer solution (pH 7.5). Thereafter, 40 liters of 150 mM. triethanolamine-HCl buffer solution (pH 7.5) were passed through the column and about 20 liters of the eluted fraction containing G-6-PDH (NADP, i.e. the eluent for the enzyme, if any, was not eluted at this time) were passed through a column of 20 liters of Sephadex G-25 to replace the solvent with 10 mM. maleic acid-NaOH buffer solution (pH 6.0). The crude enzyme solution of G-6-PDH not containing eluent, NADP, was passed through a column of 5 liters of P-cellulose to adsorb G-6-PDH on the carrier by enzymatic affinity thereof with phosphoric group of the P-cellulose. Then, 15 liters of 10 mM. maleic acid-NaOH buffer solution (pH 6.0; washing solution), 5 liters of mixture (eluent solution) of the same buffer and $10^{-4}$ M concentration of NADP which is a coenzyme for G-6-PDH and 10 liters of 10 mM. maleic acid-NaOH buffer solution (pushing out solution) were passed through the column successively. NADP began to flow from the bottom of the column and, at the same time, highly purified G-6-PHD concentrated to about 1 liter volume began to flow.

Specific activity was about 5500 I.U. per mg. of protein, degree of purification from the crude extract was about 5,000 fold and recovery was about 70%.

G-6-PDH can be crystallized by concentrating the purified G-6-PDH solution according to ultrafiltration with a Dia-filter (a product of Nihon Shinku-Gijutsu Co.), and increasing ammonium sulfate concentration gradually to about 0.7 saturation.

NADP contained therein has an effect for preventing inactivation of said enzyme but no harmful effect on quantitative determination of NADP, since NADP is in an extremely small amount. However, NADP can be removed easily according to gel filtration with Sephadex G-25.

EXAMPLE 2

[Isolation of pyruvate kinase (hereinafter referred to as PK)]

Two liters of ethyl acetate were added to 20 kg. of wet cell of yeast Candida utilis and the whole was stirred thoroughly to effect autolysis. Soluble components were extracted with 20 liters of 0.1 saturated ammonium sulfate solution at room temperature for 24 hours. Insoluble components were removed by centrifugation to obtain crude extract containing $95 \times 10^{-5}$ I.U. of PK, ¼ quantity of glycerine was added to the crude extract, the solvent in the crude extract was replaced with 50 mM. triethanolamine-HCl buffer solution (pb 7.5) containing 20% glycerine in a column of 20 liters of Sephadex. The extract was then passed through a column of 20 liters of DEAE-cellulose to adsorb PK (at this time, basic proteins were passed and thereby removed) and washed with 40 liters of 50 mM. triethanolamine-HCl buffer solution containing 20% glycerine. Thereafter, 40 liters of 200 mM. triethanolamine-HCl buffer solution containing 20% glycerine were passed through the column. About 20 liters of eluted fraction containing PK (at this ATP, i.e. the eluent of the enzyme, is not eluted) were passed through the column of 20 liters of Sephadex G-25 to replace the solvent with 10 mM. maleic acid-NaOH buffer solution (pH 6.0) containing 20% glycerine. The crude enzyme solution of PK was passed through a column of 5 liters of P-cellulose to adsorb PK by enzymatic affinity thereof with phosphoric group.

Then, 15 liters of 10 mM. maleic acid-NaOH buffer solution (pH 6.0; washing solution), 5 liters of mixture (eluent solution) of the same buffer and $10^{-3}$ M concentration of ATP which is a substrate of PK and 10 liters of 10 mM. maleic acid-NaOH buffer solution (pushing out solution) containing 20% glycerine were passed through the column successively. ATP began to flow from the bottom of the column and, at the same time, highly purified PK began to flow.

Specific activity was about 700 I.U. per mg. of protein, degree of purification from the crude extract was about 140 fold and recovery was about 60%.

EXAMPLE 3

[Isolation of 6-phosphogluconate dehydrogenase (hereinafter referred to as 6-PGDH)]

Crude extract containing $119 \times 10^{-4}$ I.U. of 6-PGDH was obtained in the same manner as in Example 2. 6-PGDH was then adsorbed on P-cellulose column by enzymatic affinity thereof with phosphoric group.

Then, 15 liters of 10 mM. maleic acid-NaOH buffer solution (pH 6.0; washing solution), 5 liters of mixture (eluent solution) of the same buffer and $5 \times 10^{-4}$ M concentration of 6-phosphogluconate which is a substrate of 6-PGHD and 10 liters of 10 mM. maleate buffer solution (pushing out solution) containing 20% glycerine were passed through the column successively. As 6-phosphogluconate began to flow from the bottom of the column, highly purified 6-PGDH began to flow. Specific activity was about 200 I.U. per mg. of protein, degree of purification from the crude extract was about 600 fold and recovery was 50%.

EXAMPLE 4

[Isolation of ribulose diphosphate carboxylase (hereinafter referred to as RuDPC)]

500 milliliters of ethyl acetate were added to 5 kg. of wet cell of yeast Candida utilis and the whole was stirred thoroughly to effect autolysis. Soluble components were extracted with 20 liters of 0.1 saturated ammonium sulfate solution at room temperature for 24 hours. Insoluble components were removed by centrifugation to obtain crude extract containing RuDPC.

The solvent in the crude extract was replaced with 150 mM. of triethanolamine-HCl buffer solution (pH 7.5) by passing the extract through a column of 20 liters of Sephadex G-25. The extract was passed through a column of 2 liters of DEAE-cellulose. Then 2 liters of 150 mM. triethanolamine-HCl buffer solution (pH 7.5) were passed through the column to collect fraction containing RuDPC. The solvent in the fraction was replaced with 10 mM. maleic acid-NaOH buffer solution (pH 6.0) by using 20 liters of Sephadex G-25.

Thus obtained crude enzyme solution of RuDPC was passed through a column of 5 liters of PPM-cellulose column to adsorb RuDPC according to enzymatic affinity thereof with phosphoric group.

Then, 15 liters of 10 mM. maleic acid-NaOH buffer solution (pH 6.0; washing solution), 5 liters of mixture (eluent solution) of the same buffer solution and $5 \times 10^{-5}$ M concentration of ribulose diphosphate and 10 liters of 10 mM. maleic acid-NaOH buffer solution (pushing out solution) were passed through the column successively. As ribulose 6-phosphate began to flow from the bottom of the column, highly purified RuDPC began to flow. Specific activity was about 1100 I.U. per mg. of protein, degree of purification from the crude extract was about 3800 fold and recovery was about 70%.

What is claimed is:

1. A method for isolation of inorganic phosphate-dependent enzymes which comprises contacting a crude enzyme solution not containing an eluent given below with a carrier comprising water-insoluble organic or inorganic compound containing

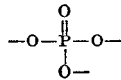

group to absorb inorganic phosphate-dependent enzymes and basic proteins not included in said enzymes on the carrier, thereafter contacting the carrier with an aqueous solution containing at least one eluent comprising a coenzyme which is competitive with inorganic phosphate in relation to respective enzymes, and specific to respective enzymes, thereby selectively eluting the absorbed respective enzymes in the aqueous solution.

2. A method for isolation of inorganic phosphate-dependent enzymes according to claim 1, which comprises contacting a crude enzyme solution not containing an eluent given below from which basic proteins have been removed previously with a carrier comprising water-insoluble organic or inorganic compound containing

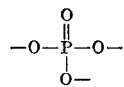

group to absorb inorganic phosphate-dependent enzymes on the carrier by enzymatic affinity thereof, thereafter contacting the carrier with an aqueous solution containing at least one eluent comprising a coenzyme which is competitive with inorganic phosphate in relation to respective enzymes, and specific to respective enzymes, thereby selectively eluting the absorbed respective enzymes in the aqueous solution.

3. A method according to claim 1, wherein the crude enzyme solution is a solution containing glucose-6-phosphate dehydrogenase and the coenzyme is nicotin-amide adenine dinucleotide phosphate.

4. A method according to claim 2, wherein the crude enzyme solution is a solution containing glucose-6-phosphate dehydrogenase and the coenzyme is nicotinamide adenine dinucleotide phosphate.

References Cited

Eley, Biochemistry, vol. 8, No. 4, April 1969, pp. 1502–1506.

Fernando et al., Archives Biochemistry and Biophysics, vol. 126, 599–606 (1968).

LIONEL M. SHAPIRO, Primary Examiner